2,852,362

Patented Sept. 16, 1958

United States Patent Office

2,852,362

PROCESS FOR FORMING TITANIUM CONCENTRATES

John M. Daubenspeck, Glendale, Mo., and Charles L. Schmidt, Rumson, N. J., assignors to National Lead Company, New York, N. Y., a corporation of New Jersey No Drawing. Application June 21, 1955
Serial No. 517,048

9 Claims. (Cl. 75—2)

The present invention relates in general to the beneficiation of titaniferous iron materials by a chlorination process and more specifically to a method for the preparation of a substantially iron-free titanium concentrate by selective chlorination of titaniferous iron material; and is a continuation-in-part of applicants' copending application Serial No. 324,818, filed December 8, 1952, now abandoned.

Several methods have been utilized heretofore to produce titanium concentrates from titaniferous iron materials by chlorination. These include chlorinating the titaniferous iron ore in either the absence or the presence of a carbonaceous reducing agent wherein the titaniferous iron material is in either finely divided or briquetted form, the chlorine gas being passed through a mixture of ore and carbon which forms a static reaction bed in the reactor. However, earlier static bed techniques have been operated at such high temperatures as to invite the formation of titanium tetrachloride; or the iron fractions have been relatively non-reactive, as a consequence of which the chlorination of the iron fraction and titanium values has not been wholly selective. And further, appreciable amounts of ferrous chloride have been formed, the latter comprising a sticky paste-like condensate which clogs up the reaction bed, conduits, valves and other elements of the chlorination apparatus, thereby terminating the reaction prematurely or rendering it so inefficient as to be commercially impracticable.

With the constantly increasing interest being shown in the production of titanium metal by Kroll type reactions embodying the use of titanium tetrachloride prepared to an important extent by chlorination of titanium concentrates, it has become of importance commercially to develop a superior process for forming titanium concentrates from titaniferous iron materials. Although the static bed type process is one of the oldest techniques and is adoptable economically to relatively small batch requirements, in relatively recent years various reactions between solids and gases have been carried out by suspending the solids in a fluidized state in a reactor by passing gases therethrough at a rate sufficient to hold the solids in suspension. Such operations are called fluidized bed reactions and are especially suited for continuous large scale operations. The instant invention is comprehensive of a superior process for forming titanium concentrates by either of these two techniques.

An object, therefore, of the present invention is to provide a simple and economical process for removing the iron fraction from a titaniferous iron material to produce a titanium concentrate.

A further object of the invention is to provide a superior method for treating titaniferous iron material with chlorine gas in the presence of a carbonaceous reducing agent such that chlorination of substantially all of the iron fractions in the ore is achieved without significant chlorination of the titanium values.

Another object of the invention is to provide a superior method for removing the iron fractions from a titaniferous iron material by the use of chlorine and a relatively low temperature operation which precludes the formation of ferrous chloride and insures the production of a substantially iron-free titanium concentrate on a commercial scale.

A still further object of the invention is to provide a superior process for removing iron from a titaniferous iron material substantially continuously by the use of chlorine and a carbonaceous reducing agent employing a fluidized bed of titaniferous material of low iron content in a reactor.

These and other objects will become apparent from the following more complete description of the invention.

In its broadest aspects the invention contemplates a process for preparing a titanium concentrate by providing a titaniferous material in which substantially all of the iron fractions of the material are reduced to the ferrous state prior to chlorination, and then chlorinating the reduced titaniferous material in the presence of a carbonaceous reducing agent to convert substantially all of the reduced iron fractions to volatile ferric chloride, the amount of carbonaceous reducing agent used being preferably sufficient only to accept the oxygen from the reduced iron fractions and the amount of chlorine used being sufficient only to form ferric chloride. A preferred embodiment of the invention is a fluidized bed operation wherein a bed comprising a titanium containing composition having a low iron content is suspended in a reactor by passing chlorine gas up through said bed, and continuously adding to said bed a feed material comprising a reduced titaniferous iron material and a carbonaceous reducing agent.

As used herein, the term "titaniferous iron material" shall be understood to include titaniferous iron ores and ore-like materials such as processed ores which have been chemically or physically treated to produce titaniferous iron concentrates, slags and similar iron containing products.

Although the beneficiation of the titaniferous iron materials to form a titanium concentrate may be carried out with a measure of success by a static bed operation wherein the "bed" constitutes the feed material which is introduced into the reactor for chlorination, for economy and commercial considerations, the fluidized bed technique is more feasible.

In general, a fluidized bed process is carried out by continuously charging the material to be chlorinated into a reactor which is heated to the required temperature for reacting chlorine with such material and passing chlorine upwardly through the material at a predetermined velocity to cause the material to surge upwardly in a turbulent fluid-like manner, the material to be chlorinated being fed continuously into the top of the reactor above the upwardly surging fluidized bed with which it becomes intimately mixed.

It is noteworthy that prior to applicants' discovery, attempts to beneficiate a mixture of titaniferous iron ore and a carbonaceous reducing agent by reacting the mixture with chlorine alone have been only partially successful, if at all.

However, the immediate success of the present invention may be attributed to the discovery that when chlorinating a titaniferous iron material by a fluidized bed reaction for the purpose of removing the iron fractions from the material without forfeiture of titanium values, the fluidized bed to which the titaniferous material to be chlorinated is fed must be substantially free of iron. By way of example, it has been discovered that rutile provides an ideal bed material for a fluidized bed reaction. Other materials as, for example, a beneficiated titaniferous ore or highly reduced titaniferous slags containing no more than 10% and preferably less than 5% iron are quite satisfactory; and even sand may be used.

It is postulated that since the fluidized bed is substantially free of iron fractions, such iron fractions as are carried into the fluidized bed by the incoming feed material are not allowed to accumulate in the bed but are chlorinated almost immediately by the chlorine; and that because of the low iron fraction in the fluidized bed the chlorine gas is always present in an amount sufficiently in excess of the amount required to form ferrous chloride, as to insure conversion of substantially all of the iron fraction in the fluidized bed to volatile ferric chloride.

With respect to the substantially iron-free fluidized bed, the latter may be formed prior to chlorination by the simple expedient of charging the reactor with a predetermined amount of rutile ore, a beneficiated titaniferous ore, or similar materials having no more than 10% and preferably less than 5% iron. However, it is within the purview of the invention to initiate the fluidized bed reaction without utilizing a preformed bed in the reactor but rather by heating the reactor to the temperature required for reacting chlorine with the titaniferous iron material to be chlorinated, passing an excess of chlorine into the reactor, and then feeding the titaniferous iron material at the predetermined rate into the upper end of the reactor. As the titaniferous material falls down into the reactor, it passes through an atmosphere comprising a large excess of chlorine gas whereupon the iron fractions in the titaniferous iron material are chlorinated relatively promptly, leaving a substantially iron-free ore in the bottom of the reactor. This substantially iron-free material ultimately accumulates in the reactor and becomes, in effect, a substantially iron-free fluidized bed equivalent in function to the performed substantially iron-free fluidized bed hereinabove described. Having formed the fluidized bed, the amount of chlorine being fed to the reactor may then be reduced to effect improved economy of operation.

In order to obtain a practical and useful type of bed in the reactor, the material which makes up the bed should have particle sizes which fall within the range of 20 mesh to 200 mesh. It is particularly desirable to have particles which cover all of the range between 20 mesh and 200 mesh since the material is suspended more easily if a range of particle sizes is present rather than if the particles are substantially all of one size.

The titaniferous iron material to be beneficiated is preferably mixed with a carbonaceous reducing agent before being added to the reactor. Thus a titaniferous iron ore having particle sizes which cover the range from about 20 to about 200 mesh and comprising from 20% to 40% total iron and from 40% to 65% titanium dioxide (the remainder being gangue) is reacted with a solid or gaseous carbonaceous reducing agent such as, for example, ground coke or carbon monoxide respectively, at a temperature of from 650° C. to 1000° C. to reduce substantially all of the iron values in the ore at least to the ferrous state. A reduced titaniferous material so produced will analyze as comprising from about 60% to about 62% titanium dioxide, from about 0 to 2% ferric iron, and from about 20% to 27% ferric iron, the balance being gangue.

To this reduced titaniferous iron material is added a carbonaceous reducing agent. The carbonaceous reducing agent may be a solid material such as, for example, ground coke; or a gaseous material such as carbon monoxide. Assuming, by way of example, that coke is to be used as the carbonaceous reducing agent, then a coke having particle sizes which cover the range of 10 mesh to 100 mesh is mixed with the reduced titaniferous material. The resulting mixture is hereinafter referred to as the titaniferous feed material. As mentioned above, it is desirable to have present in the feed material particles of the sizes which cover the entire particle size range rather than have the particles substantially all of the same size. The particle size ranges disclosed above of the materials employed in the reaction are particularly desirable since a homogeneous mixture is rapidly obtained and maintained throughout the entire reaction.

The amount of carbon in the form of coke added to the reduced titaniferous iron material is preferably sufficient to accept only the oxygen from the ferrous iron fractions in the ore. Thus, by way of example, in a reduced titaniferous iron material comprising as high as 32% iron in the ferrous state, the amount of carbon admixed therewith in the form of coke may range from 1% to 6% based on the weight of the ore but preferably is within the range of from 3% to 4%. If more carbon is present than an amount sufficient to accept the oxygen from the ferrous iron fraction in the reduced titaniferous material, an appreciable amount of the titanium values may be chlorinated, while if less than the preferred amount of carbon is used, the removal of the iron fractions may be relatively low and the use of chlorine relatively high, both of which conditions are unsatisfactory and productive of low efficiencies and high operational cost.

A preferred method for chlorinating the titaniferous feed material to form a titanium concentrate using a fluidized bed type reaction is to first provide in a reactor a fluidized bed of beneficiated titaniferous ore in the manner hereinabove described wherein the maximum iron content of the fluidized bed is no greater than 10% and preferably no more than about 5% on a weight basis. Titaniferous feed material, which has been previously reduced, as described above, so that at least 80% and preferably 90% of the iron fraction is in the ferrous state, is then introduced substantially continuously into the upper end of the reactor to drop down into the fluidized bed and thus be brought into intimate contact with the materials of the bed and the chlorine gas which is maintaining the materials at the bed in active suspension in the reactor.

The amount of chlorine used to react with the titaniferous feed material during the reaction is substantially equal to the theoretical amount required to react with the reduced iron fractions in the feed material to form ferric chloride and may be slightly in excess of this amount, any excess chlorine being recovered from the tail gases. However, inasmuch as the recovery of the excess chlorine entails the use of additional equipment at greater expense, it is preferred to use substantially the theoretical amount of chlorine required for forming ferric chloride. If less than the theoretical amount of chlorine is used, then ferrous chloride may be produced in the fluidized bed with the result that the bed may be plugged and the reaction stopped.

The chlorine gas is fed into the reactor beneath the fluidized bed so as to pass upwardly therethrough and react with the titaniferous feed material which is fed into the top of the reactor. The depth of the bed and the velocity of the chlorine gas passing through the bed should be adjusted so that the residence time of the chlorine gas in the bed is from 4 seconds to 15 seconds, and the level of the bed should be maintained relatively constant or within practical operational limits so that a balance is maintained throughout the entire reaction. The level of the bed is easily maintained by withdrawing portions of the bed from the reactor either continuously or intermittently as the reaction proceeds.

The fluid-solids reaction is preferably carried out at a temperature within the range of from 600° C. to 900° C. and preferably at a temperature between 700° C. and 800° C. At temperatures lower than 600° C. the chlorination of the iron values is incomplete, as a consequence of which phosgene gas is sometimes formed and becomes an operational hazard, while at temperatures above 900° C., titanium tetrachloride is formed whereby appreciable amounts of the titanium values are volatilized from the ore. The preferred operating temperature may be maintained by heating the reactor externally. It has been postulated, however, that some titanium tetrachloride may be formed in the fluidized bed during the reaction and that the heat developed by the exothermic reaction of the tetrachloride with the iron fractions to form volatile ferric chloride may, in part, supply the heat required to run the reaction.

As pointed out above, the chlorination of the reduced titaniferous material may be carried out in the presence of either a solid carbonaceous reducing agent or a gaseous carbonaceous reducing agent. In the latter event, it is preferred to add the carbon in the form of carbon monoxide gas admixed with the chlorine gas. Although carbon monoxide gas is a satisfactory carbonaceous reducing agent, it tends to act as a diluent of the chlorine, and consequently less chlorine may be utilized for a given space velocity. Therefore, in order to increase throughput for a given size reactor it is preferred to use a solid form of carbonaceous reducing agent.

Upon completion of the reaction the titanium values are present in the overflow from the reactor (or in the reaction bed in the case of a static bed operation) in the form of titanium dioxide, substantially all of the iron fraction being removed therefrom as volatile ferric chloride. The titanium dioxide concentrate thus recovered is especially adapted for direct applications as a synthetic rutile material or to further treatments for the production of titanium tetrachloride, titanium dioxide pigment material and similar uses.

By way of further illustrating the present invention, the following examples are given:

Example 1

A reduced ore, containing 62.0% $TiO_2$ and 31.7% FeO and substantially no ferric iron, was prepared by subjecting an ilmenite ore with a carbonaceous reducing agent to a reducing treatment at 850° C. This reduced titaniferous iron material was used in preparing the feed for carrying out the reaction.

The reactor consisted of a cylindrical tube 4 inches in diameter and 48 inches high. In the reactor on a perforated plate was placed 35 pounds of a titanium dioxide containing composition. This composition was rutile ore which contained relatively low iron values. This rutile ore had the following analysis:

| | Percent |
|---|---|
| $TiO_2$ | 89.0 |
| FeO | 3.1 |
| Other oxides | 7.9 |

Substantially all of the particles of this composition fell within the size range from 20 mesh to 200 mesh and covered the entire size range. This material constituted the bed in the reactor and the bed was suspended in the reactor by passing 6.3 pounds of chlorine gas up through the bed per hour. The suspended bed in the reactor was about 48 inches deep and since chlorine gas was added at the rate of 0.53 cubic foot per minute, which was sufficient to suspend the material in the reactor, the residence time of the chlorine gas in the reactor was about 10 seconds. The fluidized bed was heated to a temperature of 800° C. and during the entire subsequent reaction the temperature of the bed was maintained between 790° C. and 810° C.

To the suspended bed was added a mixture of the pre-reduced ore and carbon. The pre-reduced ore was admixed with 4% carbon. This amount of carbon was sufficient to accept substantially all of the oxygen in the ferrous oxide present in the reduced ore. The mixture of reduced ore and carbon was added to the suspended bed at the rate of 8.7 pounds per hour. This rate was held relatively constant throughout the entire reaction and was determined by the volume of chlorine gas passing up through the bed.

The rate of ore addition was adjusted to correspond to the chlorine added so that sufficient chlorine was present to react with all of the iron values present in the bed to form ferric chloride but at no time was the chlorine gas at the exit from the reactor in excess of 2% of that being added.

The rate of ore addition to the bed was also adjusted so that at no time during the reaction was there more than 10% iron, calculated as FeO, in the suspended bed. In this particular example the FeO content in the bed never exceeded 5% during the entire run. The ore-carbon mixture was added at a substantially constant rate of 8.7 pounds per hour for the entire run which was 14.7 hours. 90 pounds of volatilized $FeCl_3$ was removed from the bed. The level of the bed was maintained substantially constant throughout the run by continuously removing bed material at an overflow level.

Substantially all i. e., 94%, of the iron values were removed during the reaction and the bed remaining plus the portions of the bed removed constituted the titanium concentrate formed. The amount of titanium concentrate formed was 65.3 pounds and it had the following analysis:

| | Percent |
|---|---|
| $TiO_2$ | 90.4 |
| FeO | 3.1 |
| Other oxides | 6.5 |

Example 2

The procedure used in Example 1 was repeated except that a different ore was employed. The ore used contained 44.2% $TiO_2$, 38.8% FeO and 5.5% $Fe_2O_3$. After reduction this ore analyzed:

| | Percent |
|---|---|
| $TiO_2$ | 44.9 |
| FeO | 42.0 |
| $Fe_2O_3$ | 1.0 |

Chlorine gas was passed through the bed at the same rate as before in order to suspend the bed. The reduced ore, however, having a different chemical composition than the previous ore used, was added at a different rate to the bed. This particular ore was added at the rate of 6.2 pounds per hour. At this rate of addition with this particular type of material the necessary conditions are met; i. e. the amount of iron added corresponds to the amount of chlorine employed and the amount of FeO present in the bed never exceeds 10% FeO; also there is no excess chlorine in the exit gases during the reaction.

In this example after 11 hours, 38 pounds of titanium concentrate were prepared and the concentrate had the following analysis:

| | Percent |
|---|---|
| $TiO_2$ | 74.8 |
| FeO | 9.8 |
| Other oxides | 16.4 |

The iron removal was 87.5%.

Example 3

The procedure used in Example 1 was repeated except that a different reduced titaniferous iron material was employed. The reduced material analyzed:

| | Percent |
|---|---|
| $TiO_2$ | 70.4 |
| FeO | 20.7 |
| Other oxides | 8.9 |

Using the same procedure chlorine gas was passed through the bed at substantially the same rate as before in order to suspend the bed. The reduced material, however, having a different chemical composition than the previous material used, was added at a different rate to the reactor. This particular material was added at the rate of 15.4 pounds per hour.

In this example after 11 hours, 38 pounds of titanium concentrate was prepared and the concentrate had the following analysis:

| | Percent |
|---|---|
| $TiO_2$ | 86.8 |
| FeO | 5.9 |
| Other oxides | 7.3 |

The iron removal was 81%.

From the above description and by the examples presented, it has clearly been shown that a titanium concentrate high in titanium and low in iron may be prepared from a titaniferous iron material. The process according to this invention is simple and economical to employ for removing iron from a titaniferous iron material to produce a titanium concentrate. The instant process provides for a simple and continuous process for removing iron from titaniferous iron material by utilizing a fluidized bed reactor.

While this invention has been described and illustrated by the examples shown, it is not intended to be strictly limited thereto, and other variations and modifications may be employed within the scope of the following claims.

We claim:

1. A process for forming a titanium concentrate by removing iron from a titaniferous iron material comprising the steps of: forming a reduced titaniferous iron material by reacting said titaniferous iron material with a reducing agent to reduce substantially all of the iron fractions in said titaniferous iron material to the ferrous state; and reacting said reduced titaniferous material with chlorine and a carbonaceous reducing agent to remove substantially all of the ferrous iron fraction from said reduced titaniferous iron material, the amount of carbonaceous reducing agent used being sufficient only to accept substantially all of the oxygen from the ferrous iron fraction in said reduced titaniferous material and the amount of chlorine used being substantially only that amount theoretically required to convert said ferrous iron fraction to volatile ferric chloride.

2. A process for forming a titanium concentrate by removing iron from a titaniferous iron material comprising the steps of: forming a reduced titaniferous iron material by reacting said titaniferous iron material with a carbonaceous reducing agent to reduce substantially all of the iron fraction in said reduced titaniferous iron material to the ferrous state; forming a feed material by mixing said reduced titaniferous material with a carbonaceous reducing agent in an amount sufficient only to accept substantially all of the oxygen from the reduced iron fraction in said reduced titaniferous material; and fluidizing said feed material with chlorine in substantially only that amount required theoretically to convert said ferrous iron fraction to volatile ferric chloride.

3. A process for forming a titanium concentrate by removing iron from a titaniferous iron material comprising the steps of: forming a reduced titaniferous iron material by reacting titaniferous iron material having particle sizes covering the range of from 20 to 200 mesh with a carbonaceous reducing agent to convert substantially all of the iron fraction in said titaniferous iron material to the ferrous state; forming a feed material by mixing said reduced feed material with coke having particle sizes covering the range from 10 to 100 mesh and in an amount sufficient only to accept substantially all of the oxygen from the ferrous iron fraction in said reduced titaniferous material; and reacting said feed material with chorine at a temperature of from 600 to 1100° C. by fluidizing said feed material with chlorine gas in substantially only that amount required theoretically to convert said ferrous iron fraction to volatile ferric chloride.

4. Process for preparing a titanium concentrate from a titaniferous iron material which comprises; providing in a reactor a bed comprising a titaniferous material having a low iron content and particle sizes which cover the range of from about 20 mesh to about 100 mesh, passing chlorine gas through said bed material in an amount sufficient to suspend said bed, adding to the suspended bed a mixture comprising a titaniferous iron material and a carbonaceous reducing agent wherein substantially all of the iron values in said titaniferous iron material are present in the ferrous state, said titaniferous iron material having particle sizes which cover the range of from about 20 mesh to about 200 mesh and said carbonaceous reducing agent having particle sizes which cover the range of from about 10 mesh to about 100 mesh, said mixture being added to said bed at a rate such that the total amount of iron in said bed does not exceed 10% FeO, said chlorine gas being fed into said bed in an amount sufficient also to react with the iron in said mixture being added to form ferric chloride but insufficient to form more than 5% of unreacted chlorine in the exit gases from said reaction, maintaining the temperature in said bed during said reaction between about 600° C. and about 900° C., and maintaining the velocity of the chlorine gas passing through said bed such that the residence time of the chlorine gas in said bed is from 4 seconds to 15 seconds.

5. Method according to claim 4 in which at least 80% of the iron values present in said titaniferous iron material are present as ferrous iron.

6. Method according to claim 4 in which at least 90% of the iron values present in said titaniferous iron material are present as ferrous iron.

7. Method according to claim 4 in which the temperature of the bed is maintained during the reaction between about 750° C. to about 850° C.

8. Method according to claim 4 in which titaniferous iron material is a pre-reduced ilmenite ore which is formed by the heat treatment of ilmenite ore with a carbonaceous reducing agent to reduce substantially all of the iron values to the ferrous state.

9. Method according to claim 4 in which sufficient carbonaceous reducing agent is present in said mixture to accept the oxygen from the ferrous iron oxide values in said titaniferous iron material.

References Cited in the file of this patent

UNITED STATES PATENTS

| 1,013,498 | Koehler | Jan. 2, 1912 |
| 1,937,661 | Meyer | Dec. 5, 1933 |
| 2,133,997 | Maier | Oct. 25, 1938 |
| 2,133,998 | Maier | Oct. 25, 1938 |
| 2,184,884 | Muskat et al. | Dec. 26, 1939 |
| 2,184,885 | Muskat et al. | Dec. 26, 1939 |
| 2,184,887 | Muskat et al. | Dec. 26, 1939 |
| 2,621,118 | Cyr et al. | Dec. 9, 1952 |